United States Patent
Ito et al.

(10) Patent No.: US 8,833,566 B2
(45) Date of Patent: Sep. 16, 2014

(54) OPTICAL GRANULAR MATERIAL-SORTING APPARATUS UTILIZING PIEZOELECTRIC VALVE

(71) Applicants: Satake Corporation, Tokyo (JP); Mechano Transformer Corporation, Kawasaki (JP)

(72) Inventors: Takafumi Ito, Tokyo (JP); Teruhiko Takeuchi, Tokyo (JP); Takeshi Yano, Kawasaki (JP); Sze Keat Chee, Kawasaki (JP); Toshiro Higuchi, Tokyo (JP)

(73) Assignees: Satake Corporation, Tokyo (JP); Mechano Transformer Corporation, Kawasaki-Shi (JP)

( * ) Notice: Subject to any disclaimer, the term of this patent is extended or adjusted under 35 U.S.C. 154(b) by 0 days.

(21) Appl. No.: 13/907,629

(22) Filed: May 31, 2013

(65) Prior Publication Data

US 2013/0256200 A1    Oct. 3, 2013

Related U.S. Application Data

(62) Division of application No. 13/107,332, filed on May 13, 2011, now Pat. No. 8,662,312.

(30) Foreign Application Priority Data

May 21, 2010   (JP) ................ 2010-117004

(51) Int. Cl.
| | | |
|---|---|---|
| *B07C 5/00* | (2006.01) | |
| *F16K 31/00* | (2006.01) | |
| *B07C 5/36* | (2006.01) | |
| *B07B 4/02* | (2006.01) | |
| *B07C 5/342* | (2006.01) | |

(52) U.S. Cl.
CPC ............ *B07C 5/366* (2013.01); *F16K 31/004* (2013.01); *B07B 4/02* (2013.01); *B07C 5/3425* (2013.01); *B07C 5/365* (2013.01); *B07C 5/3422* (2013.01); *Y10S 209/938* (2013.01)
USPC ......................... 209/552; 209/938

(58) Field of Classification Search
USPC ........................ 209/552, 644, 938
See application file for complete search history.

(56) References Cited

U.S. PATENT DOCUMENTS

| | | | |
|---|---|---|---|
| 5,524,746 A * | 6/1996 | Massen et al. ............. | 198/443 |
| 5,631,460 A | 5/1997 | Gray et al. | |

(Continued)

FOREIGN PATENT DOCUMENTS

| | | |
|---|---|---|
| CN | 1161254 A | 10/1997 |
| CN | 201357150 Y | 12/2009 |
| JP | S62-142845 A | 6/1987 |
| JP | H03-014982 A | 1/1991 |

(Continued)

OTHER PUBLICATIONS

A Notification of First Office Action with Search Report issued by the State Intellectual Property Office of China, mailed Feb. 8, 2014, for Chinese counterpart application No. 201110111917.5.

(Continued)

*Primary Examiner* — Terrell Matthews
(74) *Attorney, Agent, or Firm* — Law Office of Katsuhiro Arai

(57) ABSTRACT

An optical granular material-sorting apparatus includes: a transfer means for transferring objects being sorted; an optical detection means for detecting, at a detection position, objects being sorted as they drop from an end of the transfer means; and a blasting means provided below the optical detection means and designed to blow away objects being sorted through blasting of air based on the result of detection by the optical detection means. The blasting means has a piezoelectric valve which is driven by a driving means to blast air based on the result of detection by the optical detection means. The driving means applies voltage to a piezoelectric element in multiple stages so as to suppress fluctuation in the amount of gas ejected from a gas release channel when the valve opens.

9 Claims, 6 Drawing Sheets

(56) References Cited

U.S. PATENT DOCUMENTS

| | | | |
|---|---|---|---|
| 6,189,858 B1* | 2/2001 | Miyazoe et al. | 251/129.06 |
| 6,840,466 B2* | 1/2005 | Igashira et al. | 239/585.1 |
| 7,360,750 B2* | 4/2008 | Yano et al. | 251/129.07 |
| 7,800,009 B2* | 9/2010 | Gochar, Jr. | 209/576 |
| 7,802,685 B2* | 9/2010 | Allen et al. | 209/12.1 |
| 8,269,845 B2* | 9/2012 | Fruehwirth et al. | 348/210.99 |
| 2006/0260701 A1* | 11/2006 | Mattes | 137/803 |
| 2011/0284431 A1* | 11/2011 | Ito et al. | 209/552 |

FOREIGN PATENT DOCUMENTS

| | | |
|---|---|---|
| JP | H06-041876 A | 2/1994 |
| JP | H11-179292 A | 7/1999 |
| JP | 2004-316835 A | 11/2004 |

OTHER PUBLICATIONS

A Notice of Reasons for Rejection issued by Japanese Patent Office, mailed Jan. 17, 2014, for Japanese counterpart application No. 2011-117004.

* cited by examiner (a)　　　　　　　　(b)

OPTICAL GRANULAR MATERIAL-SORTING APPARATUS UTILIZING PIEZOELECTRIC VALVE

CROSS-REFERENCE TO RELATED APPLICATIONS

This application is a divisional of U.S. patent application Ser. No. 13/107,332, filed May 13, 2011, now U.S. Pat. No. 8,662,312, which claims the benefit of Japanese Patent Application No. 2010-117004, filed May 21, 2010, the disclosure of which is herein incorporated by reference in its entirety. The applicant(s) herein explicitly rescind(s) and retract(s) any prior disclaimers or disavowals made in any parent, child or related prosecution history with regard to any subject matter supported by the present application.

BACKGROUND OF THE INVENTION

1. Field of the Invention

The present invention relates to a piezoelectric valve opened or closed by means of displacement of a piezoelectric element, as well as an optical granular material-sorting apparatus that utilizes such piezoelectric valve and that sorts granular materials by blowing away defective materials, etc., with a blast.

2. Description of the Related Art

Optical granular material-sorting apparatuses have traditionally been known where grain kernels, resin pellets and other granular materials are sorted into good materials and defective materials by blowing away defective materials by a blast, or foreign objects, etc., that have mixed into granular materials are removed with a blast.

Granular material-sorting apparatuses of this type are designed to sort granular material as it drops from an end of a transfer channel along a specified path, by blowing away and removing defective materials, etc., based on defective material detection signals.

The aforementioned granular material-sorting apparatuses are intended to blow away defective materials, etc., from among a large amount of granular materials that drops continuously, by means of an air blast, and therefore require that a blast nozzle be provided with a responsive valve in order to accurately blow away only defective materials, etc., without allowing other granular materials to be blown away with the defective materials.

For this reason, the applicant of the present application for patent had earlier proposed a piezoelectric air valve that can be opened or closed at high speed by utilizing a piezoelectric element (refer to Patent Literature 1).

The piezoelectric air valve described in Patent Literature 1 utilizes the characteristics of a piezoelectric element offering excellent high-speed response, and is provided with a displacement amplification mechanism that amplifies a small displacement of the piezoelectric element based on the principle of leverage.

This piezoelectric air valve is designed in such a way that when voltage is applied to the piezoelectric element, a displacement of the piezoelectric element occurring in the stretching direction of the element is transmitted to a valve body via the aforementioned displacement amplification mechanism and consequently the valve body moves quickly and the valve opens.

This piezoelectric air valve is also designed in such a way that when the voltage applied to the piezoelectric element is removed, the piezoelectric element returns to its original state and during this process, the force generated by the element as it returns to its original state is transmitted to the valve body via the aforementioned displacement amplification mechanism and consequently the valve body quickly contacts a valve seat and the valve closes.

An optical granular material-sorting apparatus having the aforementioned piezoelectric air valve provides superior response of valve opening/closing compared to any conventional electromagnetic valve, and is therefore capable of blowing away defective materials, etc., accurately while keeping to a minimum the possibility of good materials before and after those defective materials getting blown away with the defective materials.

Note that with granular material-sorting apparatuses of this type, the air blasting time is often changed according to the dropping speed, size of granular materials, etc., in order to improve the sorting accuracy (refer to Patent Literatures 2 and 3).

However, the optical granular material-sorting apparatus having the aforementioned piezoelectric air valve is such that the piezoelectric air valve has a valve body that is moved via the displacement amplification mechanism, which means that if the air blasting time becomes longer, the valve body may vibrate and the amount of blast released from the nozzle may fluctuate, thereby preventing the sorting apparatus from demonstrating stable sorting action.

[Patent Literature 1] Japanese Patent Laid-open No. 2004-316835
[Patent Literature 2] Japanese Patent Laid-open No. Hei 11-179292
[Patent Literature 3] Japanese Utility Model Laid-open No. Hei 6-41876

SUMMARY OF THE INVENTION

In light of the above, it is an object of the present invention to provide a piezoelectric valve capable of supplying gas in a stable manner even when the ejection time of such gas becomes longer.

It is another object of the present invention to provide an optical granular material-sorting apparatus that utilizes the aforementioned piezoelectric valve to blow away defective materials, etc., reliably, thereby demonstrating stable sorting action with respect to granular materials.

To achieve the aforementioned objects, the present invention provides a piezoelectric valve comprising: a valve main body formed in which are a gas pressure chamber that takes in compressed gas supplied from the outside as well as a gas release channel through which the compressed gas is released from the gas pressure chamber; a valve body placed in the gas pressure chamber to open and close the gas release channel; a piezoelectric element that generates, in the form of displacement, a driving force needed to move the valve body; at least one displacement amplification mechanism that amplifies a displacement of the=piezoelectric element and causes it to act upon the valve body; and a driving means for applying voltage to the piezoelectric element in order to move the valve body to open the valve and thereby open the gas release channel; wherein such piezoelectric valve is characterized in that the driving means applies voltage to the piezoelectric element in multiple stages so as to suppress fluctuation in the amount of gas ejected from the gas release channel when the valve opens.

Under the present invention, the aforementioned driving means should preferably apply to the piezoelectric element in stages: a first voltage at which the valve body is driven to open the valve, and a second voltage which is greater than the first voltage and at which the ejection amount of gas is maintained after the valve opens.

Under the present invention, the aforementioned driving means should preferably allow the first voltage and application time thereof, as well as the second voltage, to be stored and set beforehand.

Under the present invention, the aforementioned driving means should preferably remove the voltage applied to the piezoelectric element, in stages, so that gas will not leak from the gas release channel after the valve closes.

Under the present invention, the aforementioned driving means should preferably apply pulsed voltage, after the removal of the voltage applied to the piezoelectric element, so that gas will not leak from the gas release channel after the valve closes.

The present invention also provides an optical granular material-sorting apparatus comprising: a transfer means for transferring objects being sorted; an optical detection means for detecting, at a detection position, objects being sorted as they drop from an end of the transfer means; and a blasting means provided below the optical detection means and designed to blow away objects being sorted, by means of blasting of air based on the result of detection by the optical detection means; wherein such optical granular material-sorting apparatus is characterized in that the blasting means has any one of the aforementioned piezoelectric valves and the piezoelectric valve is driven to blast air based on the result of detection by the optical detection means.

The piezoelectric valve proposed by the present invention can supply gas in a stable manner even when the gas ejection time becomes longer, because the driving means applies voltage to the piezoelectric element in multiple stages so as to suppress fluctuation in the amount of gas ejected from the gas release channel when the valve opens.

The piezoelectric valve proposed by the present invention can supply gas in a stable manner even when the gas ejection time becomes longer, because, if the driving means applies to the piezoelectric element in stages a first voltage at which the valve body is driven to open the valve, and a second voltage which is greater than the first voltage and at which the ejection amount of gas is maintained after the valve opens, then valve vibration that would otherwise occur as the valve opens is suppressed by the application of the second voltage.

The piezoelectric valve proposed by the present invention can supply gas in a stable manner even when the gas ejection time becomes longer, because, if the driving means stores and sets the first voltage and application time thereof as well as the second voltage beforehand, then valve vibration that would otherwise occur as the valve opens is suppressed reliably by the application of the second voltage.

The piezoelectric valve proposed by the present invention can prevent leakage of gas from the gas release channel after the valve closes, because, if the voltage applied to the piezoelectric element is removed by the driving means in stages at timings preventing leakage of gas from the gas release channel after the valve closes, then the impact of seating of the valve body can be absorbed/mitigated and bouncing of the valve body can be prevented.

The piezoelectric valve proposed by the present invention can prevent leakage of gas from the gas release channel after the valve closes, because, if pulsed voltage is applied by the driving means after the removal of the voltage applied to the piezoelectric element and at timings preventing leakage of gas from the gas release channel after the valve closes, then the impact of seating of the valve body can be absorbed/mitigated and bouncing of the valve body can be prevented.

The optical granular material-sorting apparatus proposed by the present invention, if it is provided with any one of the aforementioned piezoelectric valves, can supply air in a stable manner even when the blasting time becomes longer and, coupled with the good response of opening/closing of the piezoelectric valve, can blow away defective materials, etc., reliably without allowing good materials before and after the defective materials to be blown away with the defective materials, and can thereby sort granular materials in a stable manner.

DESCRIPTION OF THE SYMBOLS

Figure 1:
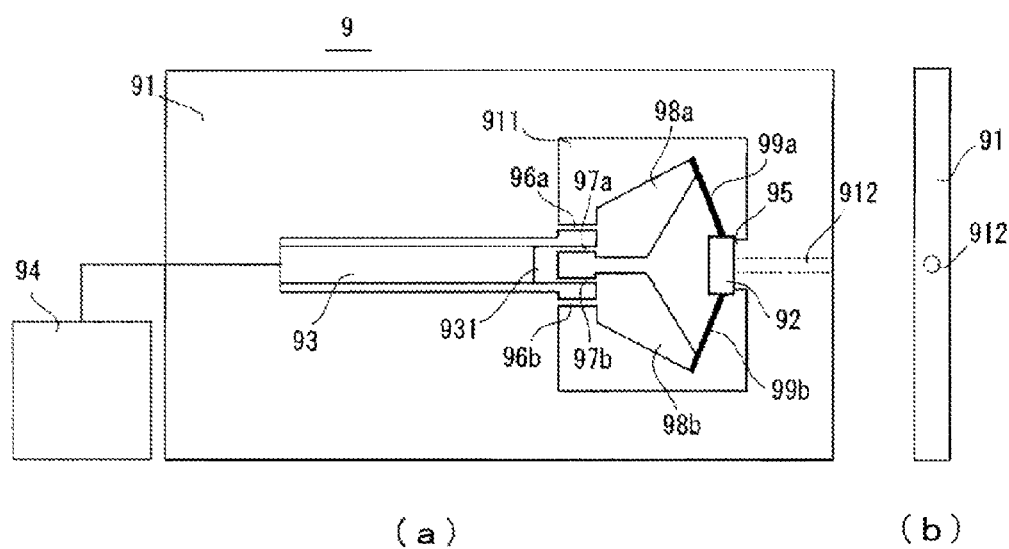
FIG. 1 is a schematic drawing explaining a piezoelectric valve.

1 Optical granular material-sorting apparatus
4 Inclined chute
5a, 5b Optical detection unit
51a, 51b CCD camera (imaging means)
6 Control unit
7 Blasting unit
71 Blasting nozzle
72 Drive unit
73 Compressed air supply unit
9 Piezoelectric valve
91 Valve main body
911 Gas pressure chamber
912 Gas release channel
92 Valve body
93 Piezoelectric element
94 Drive unit
95 Valve seat
96a, 96b, 97a, 97b Hinge
98a, 98b Arm member
99a, 99b Plate spring

DETAILED DESCRIPTION OF THE PREFERRED EMBODIMENT

A mode for carrying out the present invention is explained based on the drawings.
<Piezoelectric Valve>
FIG. 1 is a schematic drawing explaining a piezoelectric valve 9, where (a) is a side view when the valve is closed, while (b) is a front view.

The piezoelectric valve 9 comprises: a valve main body 91 having a gas pressure chamber 911 that takes in supply of compressed gas from a compressed gas supply source provided externally (not illustrated), and a gas release channel 912 through which gas in the gas pressure chamber 911 is ejected to the outside; a valve body 92 placed in the gas pressure chamber 911 to open and close the gas release channel 912; a piezoelectric element 93 placed in the valve main body 91 with its one end affixed to the valve main body 91; a displacement amplification mechanism placed in the gas pressure chamber 911 to amplify a displacement of the piezoelectric element 93 and cause it to act upon the valve body 92; and a drive unit 94 that applies voltage to the piezoelectric element 93 and drives the valve body 92 to open and close the valve; wherein the valve body 92 is separated from or seated onto a valve seat 95 formed as a projection on the gas pressure chamber 911 side of the gas release channel 912 in order to open and close the valve.

Here, the aforementioned drive unit 94 is provided with a drive circuit that applies voltage to the piezoelectric element 93, and any drive circuit can be used as long as it electrically connects to the piezoelectric element, and it is not necessary for the drive circuit to be physically integrated with the valve main body 91, etc., for example.

The aforementioned displacement amplification mechanism is provided as a pair of mechanisms placed symmetrically across a line connecting the lengthwise axial line of the piezoelectric element 93 and the gas release channel 912 (this line is hereinafter referred to as the "centerline").

A first displacement amplification mechanism is constituted by a first hinge 96a, a second hinge 97a, a first arm member 98a and a first plate spring 99a. One end of the first hinge 96a is joined to the valve main body 91. One end of the second hinge 97a is joined to a cap member 931 installed on the piezoelectric element 93. The other ends of the first hinge 96a and second hinge 97a are joined to a base of the first arm member 98a. The first arm member 98a extends toward the valve body 92 in the direction of moving away from the centerline, and one end of the first plate spring 99a is joined to the tip of this member. The other end of the first plate spring 99a is joined to one side of the valve body 92.

On the other hand, a second displacement amplification mechanism is constituted by a third hinge 96b, a fourth hinge 97b, a second arm member 98b and a second plate spring 99b. One end of the third hinge 96b is joined to the valve main body 91. One end of the fourth hinge 97b is joined to the cap member 931 installed on the piezoelectric element 93. The other ends of the third hinge 96b and fourth hinge 97b are joined to a base of the second arm member 98b. The second arm member 98b extends toward the valve body 92 in the direction of moving away from the centerline, and one end of the second plate spring 99b is joined to the tip of this member. The other end of the second plate spring 99b is joined to the other side of the valve body 92.

The piezoelectric valve 9 is designed in such a way that when power is applied to the piezoelectric element 93 from the drive unit 94 in the condition shown in FIG. 1 (a), the piezoelectric element 93 stretches to the right in the drawing. As the element stretches, in the first displacement amplification mechanism the second hinge 97a acts as a point of force, the first hinge 96a acts as a fulcrum, and the tip of the first arm member 98a acts as a point of action, and the amount of displacement of the piezoelectric element 93 is amplified based on the principle of leverage and presents at the tip of the first arm member 98a. Similarly, in the second displacement amplification mechanism the fourth hinge 97b acts as a point of force, the third hinge 96b acts as a fulcrum, and the tip of the second arm member 98b acts as a point of action, and the amount of displacement of the piezoelectric element 93 is amplified and presents at the tip of the second arm member 98b.

This displacement, presenting itself in a condition amplified in the direction of separating the tips of the first arm member 98a and second arm member 98b, causes the valve body 92 to move away by an ample distance from the valve seat 95 via the first plate spring 99a and second plate spring 99b, thereby creating a large gap in between. As a result, the piezoelectric valve 9 opens and an ample amount of gas is ejected to the outside from the gas pressure chamber 911 through the gas release channel 912.

Meanwhile, the piezoelectric element 93 of the piezoelectric valve 9 contracts when the power applied to the piezoelectric element 93 from the drive unit 94 is removed, and this contraction is transmitted to the valve body 92 via the first and second displacement amplification mechanisms and the valve body 92 is seated on the valve seat 95. At this time, the piezoelectric valve 9 also effectively exerts onto the valve body 92 the return forces of the first plate spring 99a and second plate spring 99b to make sure the valve body 92 is seated on the valve seat 95 securely.

It goes without saying that, while the piezoelectric valve 9 has the side of the gas pressure chamber 911 open to the outside in the example shown in FIG. 1, the air pressure chamber 911 is used in a sealed condition.

EXAMPLES

Comparative Example

Figure 2:
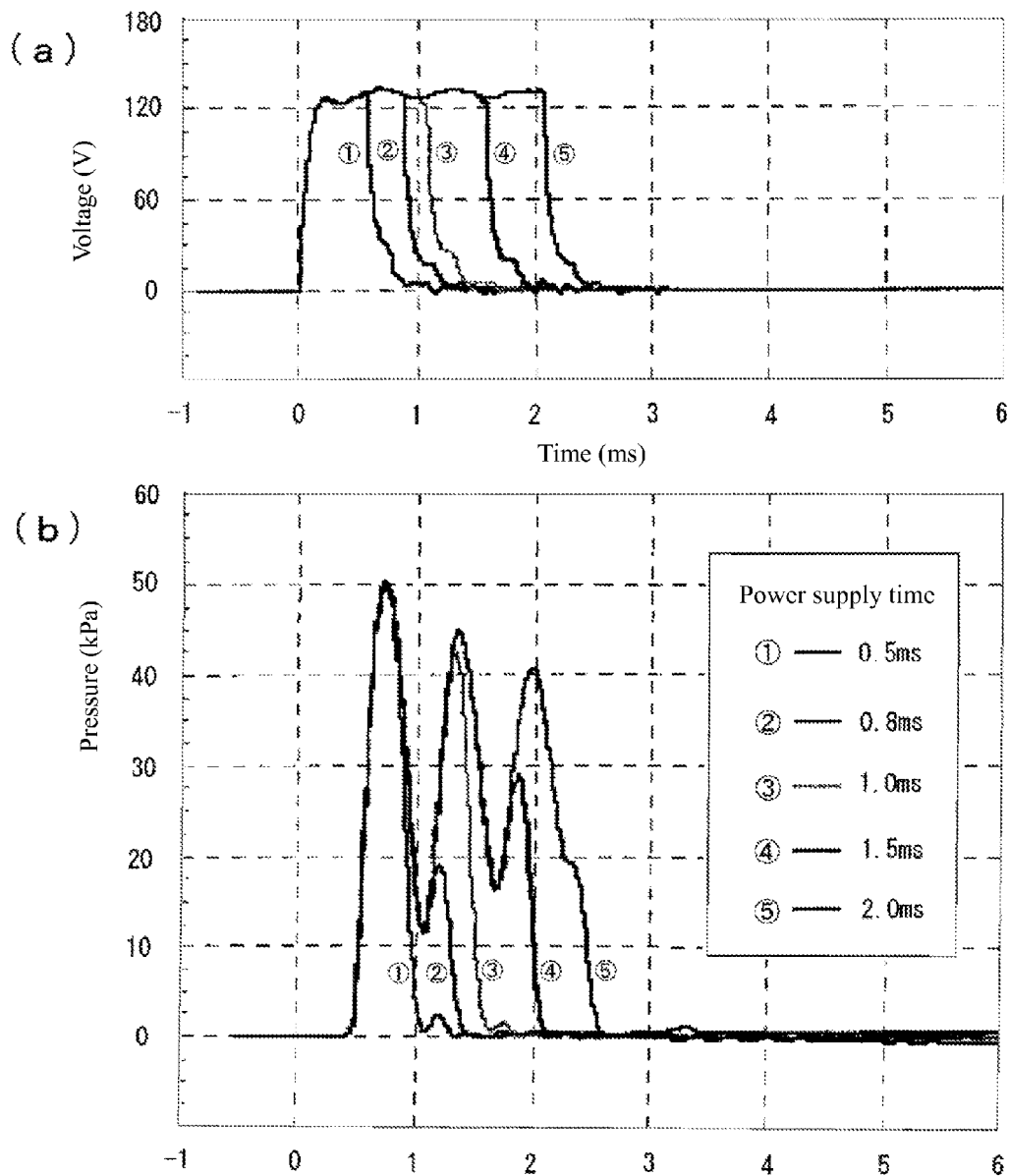
FIG. 2 is a graph showing the relationship, in a conventional example, of voltage waveform applied to the piezoelectric element, and pressure characteristics of air ejected from the valve, with respect to the piezoelectric valve shown in FIG. 1.

FIG. 2 is a graph showing the relationship of voltage waveform on one hand, and pressure characteristics of air ejected from the gas release channel 912 on the other hand, with respect to the piezoelectric valve 9 shown in FIG. 1, in a conventional example where the drive unit 94 applies constant voltage, or applies voltage in a single stage, to the piezoelectric element 93. (a) shows voltage waveform, while (b) shows pressure characteristics of air ejected from the gas release channel 912. Here, compressed air was used as the compressed gas supplied externally to the piezoelectric valve 9.

The test conditions used to obtain the graph in FIG. 2 are as follows:
(1) Compressed air supply pressure: 0.25 MPa
(2) Set flow rate of compressed air: 50 L/min
(3) Power supply time: 0.5 to 2.0 ms
(4) Applied voltage: 130 VDC
(5) Inner diameter of gas release channel: 0.24 mm
(6) Pressure detection position: 2 mm from the tip of the gas release channel In FIG. 2, a clear peak is shown in the pressure characteristics at the power supply time of 0.5 ms. The second peak of pressure characteristics starts to form at the power supply time of 0.8 ms and the pressure characteristics draw two clear peaks by the power supply time of 1.0 ms. The third peak of pressure characteristics starts to form at the power supply time of 1.5 ms and the pressure characteristics draw three peaks by the power supply time of 2.0 ms. Based on the above, FIG. 2 shows that when voltage is applied to the piezoelectric element 93 in a single stage, the pressure characteristics oscillate as the power supply time becomes longer.

This indicates that, as the air blasting time becomes longer, the valve body 92 of the piezoelectric valve 9 vibrates and the amount of air ejected from the gas release channel 912 fluctuates.

FIG. 2 shows that the pressure fluctuates somewhat after the valve closes, and this is probably because the valve body 92 contacting the valve seat 95 bounces upon closing of the valve, resulting in leakage of air.

Example

Figure 3:
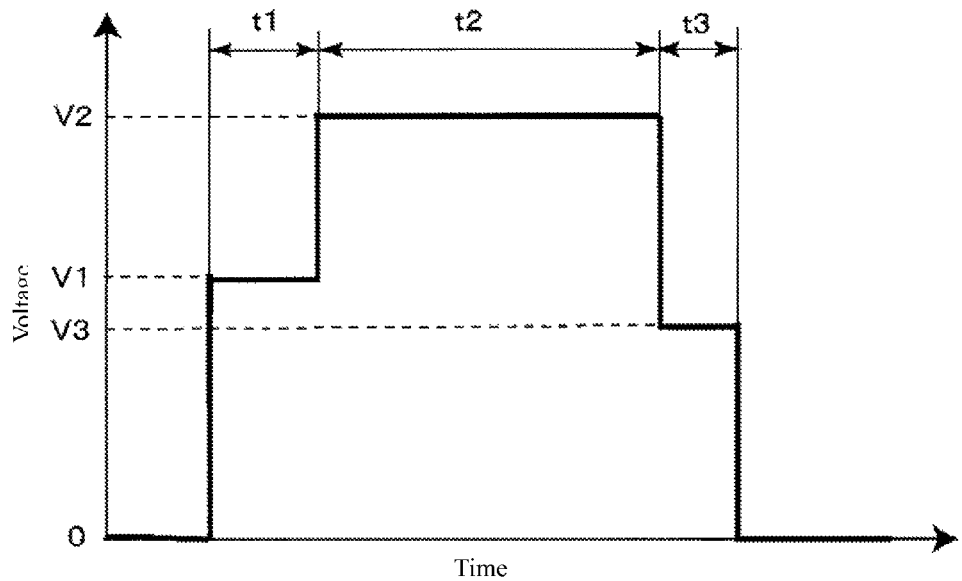
FIG. 3 illustrates an example of voltage waveform applied to the piezoelectric element of a piezoelectric valve conforming to the present invention.

FIG. 3 shows an example of the voltage waveform applied, under the present invention, to the piezoelectric element 93 from the drive unit 94 when the piezoelectric valve opens.

As shown in FIG. 3, a first-stage voltage V1 is applied first to the piezoelectric element 93 in a manner allowing an ample amount of gas to be ejected from the gas release channel 912, to drive the valve body 92 to open the valve. Thereafter at a timing to suppress fluctuation in the ejection amount of gas, or specifically at a timing to prevent the valve body 92 from vibrating due to reaction to the valve opening (after an elapse of time t1 following the application of first-stage voltage V1), a second-stage voltage V2 which is greater than the first-stage voltage V1 is applied for the purpose of maintaining the aforementioned ejection amount of gas, and this condition is maintained for the duration of time t2.

Once the gas ejection time (t1+t2) elapses, the valve body 92 is driven to close the valve, where, in the example shown in FIG. 3, the voltage applied to the piezoelectric element 93 is not removed all at once, but instead a third-stage voltage V3 smaller than the second-stage voltage V2 is applied first. Thereafter at a timing to prevent leakage of gas after the valve closes, or specifically at a timing to mitigate/absorb the impact of contact of the valve body 92 with the valve seat 95 as the valve closes and thereby prevent bouncing of the valve body 92 (after an elapse of time t3 following the application of third-stage voltage V3), the voltage applied to the piezoelectric element 93 is removed.

Note that the values of the aforementioned applied voltages V1, V2, V3 and times t1, t3 can be obtained by testing and stored and set in the drive unit 94 beforehand.

Figure 4:
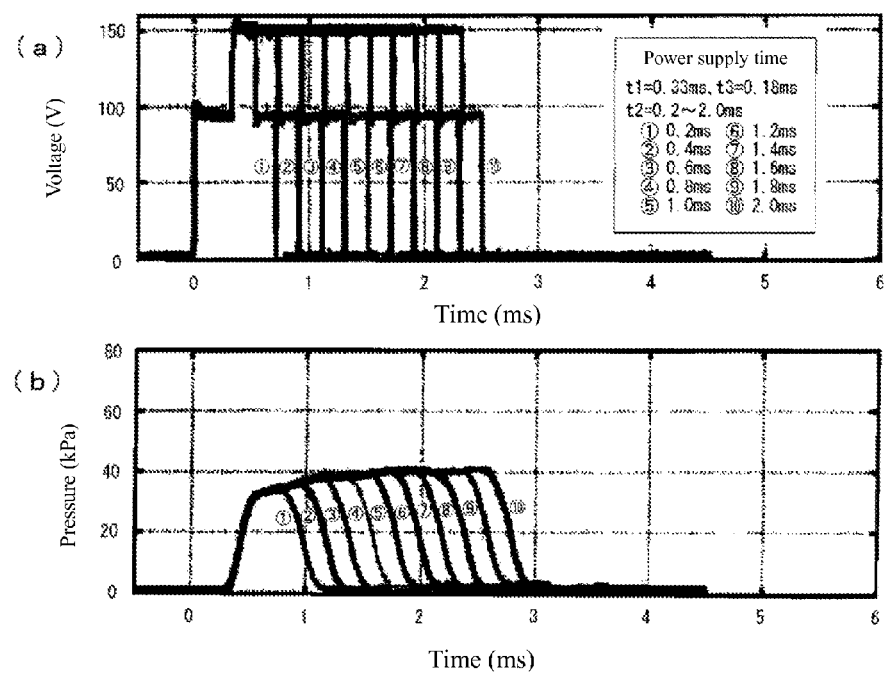
FIG. 4 is a graph showing the relationship, under the present invention, of voltage waveform applied to the piezoelectric element, and pressure characteristics of air ejected from the valve, with respect to the piezoelectric valve shown in FIG. 1.

FIG. 4 is a graph showing the relationship of voltage waveform on one hand, and pressure characteristics of air ejected from the air release channel 912 of the valve on the other hand, in an example of the present invention where the drive unit 94 applies voltage of the waveform shown in FIG. 3 to the piezoelectric element 93. (a) shows voltage waveform, while (b) shows pressure characteristics of air ejected from the air release channel 912. Here, compressed air was again used, as in the example of FIG. 2, as the compressed gas supplied externally to the piezoelectric valve 9.

The test conditions used to obtain the graph in FIG. 4 are as follows:

(1) Compressed air supply pressure: 0.25 MPa
(2) Set flow rate of compressed air: 50 L/min
(3) Power supply time: 0.71 to 2.51 ms (where, application time t1 of first-stage voltage V1=0.33 ms, and application time t3 of third-stage voltage=0.18 ms)
(4) Applied voltage: First-stage voltage V1=100 VDC, second-stage voltage V2=150 VDC, and third-stage voltage V3=100 VDC
(5) Inner diameter of gas release channel: 0.24 mm
(6) Pressure detection position: 2 mm from the tip of the gas release channel Although the maximum pressure tends to increase gradually as the power supply time becomes longer in FIG. 4, the oscillation of pressure characteristics evident in FIG. 2 is completely suppressed.

Accordingly, FIG. 4 shows that, when voltage is applied in two stages to the piezoelectric element 93 when the valve opens, its pressure characteristics are maintained in roughly a stable manner even if the power supply time becomes longer.

This indicates that by setting the aforementioned first-stage voltage V1 to a low value at which the minimum required blast amount of air could be obtained and thereby preventing reaction of the valve body 92 to the valve opening, and also by applying the second-stage voltage V2 at a timing to prevent the valve body 92 from vibrating, the vibration of the valve body 92 due to the application of first-stage voltage was cancelled out by the operation of the valve body 92 due to the application of second-stage voltage, thereby ensuring a stable supply of blasted air in terms of amount.

On the other hand, in FIG. 4, the pressure fluctuation shown in FIG. 2 after the valve closes is absent.

This indicates that by applying the third-stage voltage as an intermediate voltage when the voltage applied to the piezoelectric element 93 is removed, and by removing the voltage at a timing to prevent the valve body 92 from bouncing as it contacts the valve seat 95, the impact of seating of the valve body 92 could be mitigated/absorbed and leakage of air from the gas release channel 912 could be prevented.

Figure 5:
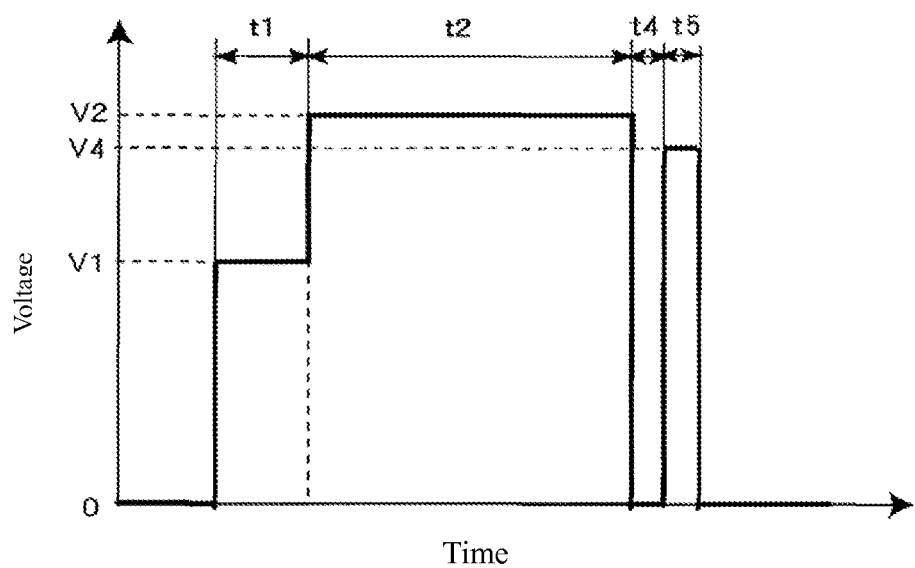
FIG. 5 is a drawing showing another example of voltage waveform applied to the piezoelectric element of a piezoelectric valve conforming to the present invention.

FIG. 5 shows an example of variation of the voltage waveform applied to the piezoelectric element 93 from the drive unit 94 under the present invention.

The voltage waveform shown in FIG. 5 is almost the same as the waveform shown in FIG. 3, with the only difference being the waveform at the fall of voltage, where the voltage applied to the piezoelectric element 93 is removed after an elapse of the gas ejection time (t1+t2). Thereafter at a timing to prevent leakage of air after the valve closes, or specifically at a timing to mitigate/absorb the impact of contact of the valve body 92 with the valve seat 95 as the valve closes and thereby prevent bouncing of the valve body 92 (after an elapse of time t4 following the removal of applied voltage), a pulsed voltage V4 is applied again for the duration of time t5.

Note that the values of the aforementioned applied voltages V1, V2, V4 and times t1, t4, t5 can also be obtained by testing and stored and set in the drive unit 94 beforehand.

<Optical Granular Material-Sorting Apparatus>

Next, an optical granular material-sorting apparatus 1 that utilizes a piezoelectric valve 9 conforming to the present invention is explained.

Figure 6:
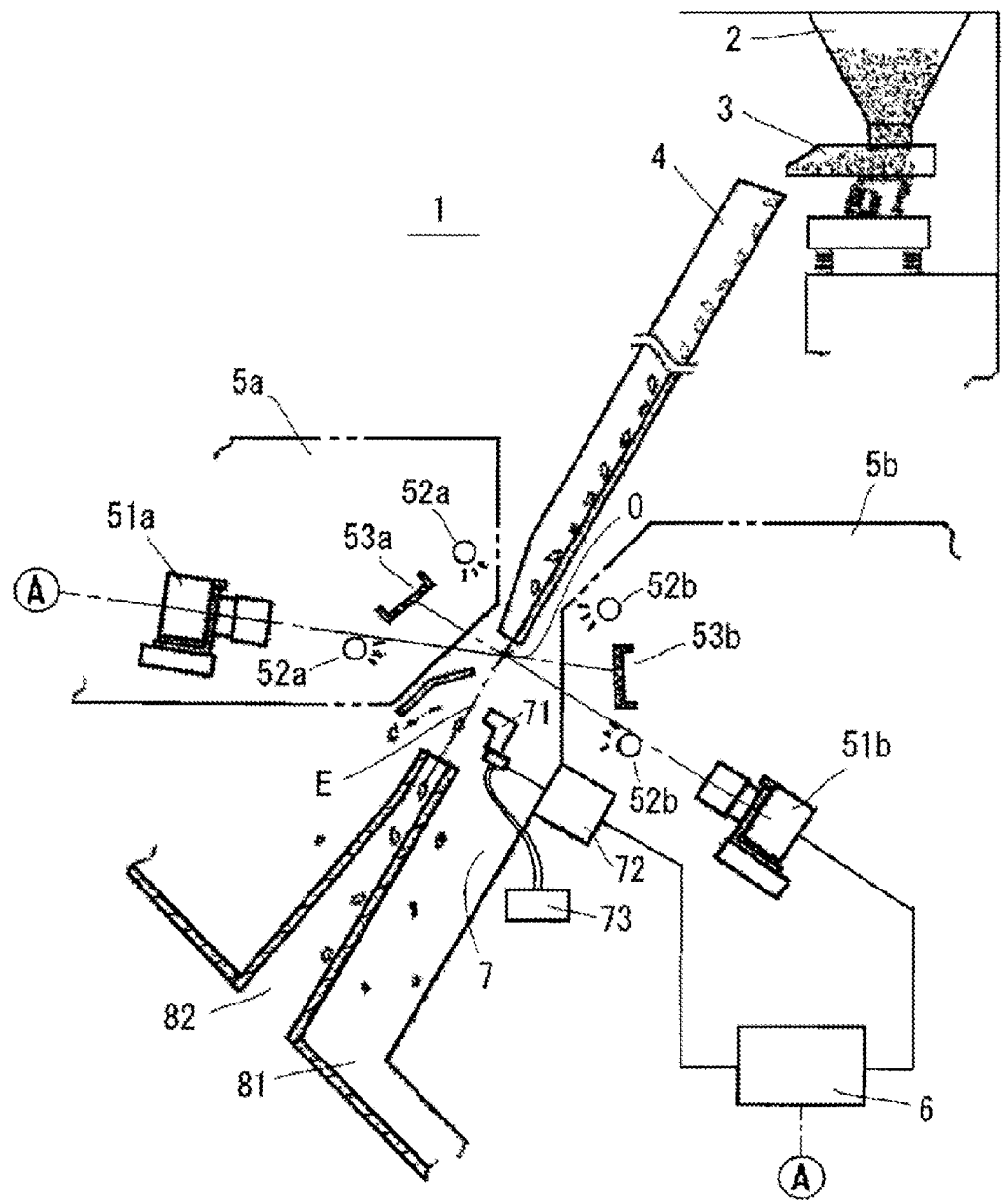
FIG. 6 is a section view showing the key parts of an optical granular material-sorting apparatus that utilizes a piezoelectric valve conforming to the present invention.
Figure 7:
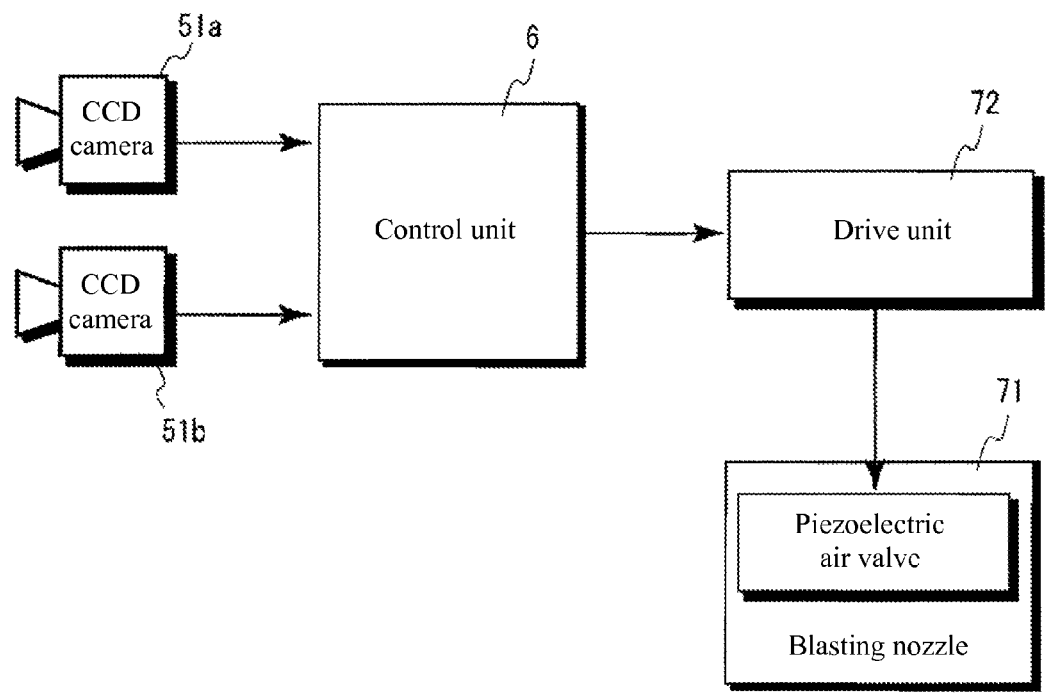
FIG. 7 illustrates a control block diagram of the granular material-sorting apparatus shown in FIG. 6.

FIG. 6 is a section view showing the key parts of this granular material-sorting apparatus 1, providing a schematic illustration of its internal structure. FIG. 7 is a control block diagram of the granular material-sorting apparatus.

The granular material-sorting apparatus 1 has on top a granular material supply part constituted by a tank 2 and a vibration feeder 3. An inclined chute 4 having a specified width is placed in a lower part of the granular material supply part.

Granular materials supplied from the granular material supply part flows down the inclined chute 4 continuously by gravity and then is released into air from the bottom of the chute along a specified drop path.

At the front and rear of the specified drop path, at least one pair of optical detection units 5a, 5b are placed in a manner facing each other, wherein these units are used to capture images of granular materials at a detection position O along the drop path. Each of the optical detection units 5a, 5b is constituted by an imaging means 51a or 51b such as a CCD camera with a built-in CCD line sensor, an illumination means 52a or 52b constituted by a fluorescent lamp, etc., and a background 53a or 53b, among others.

Also, a blasting unit 7 that removes defective materials, etc., by blasting air is placed below the aforementioned detection position O. The blasting unit 7 comprises a blasting nozzle 71 in which the piezoelectric valve conforming to the present invention is assembled, and a compressed air supply unit 73 that feeds compressed air to the blasting nozzle 71. Note that the piezoelectric valve is constructed integrally with a drive unit 72 having a drive circuit that electrically connects to a piezoelectric element.

The optical detection units 5a, 5b capture images of granular materials using their imaging means 51a, 51b such as CCD cameras at the detection position O along the drop path, and send the captured image data to a control unit 6. The control unit 6 identifies granular materials that is defective or must otherwise be removed based on the aforementioned image data, while obtaining size and other information of the applicable granular materials and sending signals to discharge the defective materials, etc., to the drive unit 72 that drives the piezoelectric valve.

The blasting unit 7 blasts air from the blasting nozzle 71 against defective materials, etc., as they pass through a discharge position E, based on the aforementioned discharge signals sent to the drive unit 72 from the control unit 6. At this time, the drive unit 72 applies voltage of the waveform shown in FIG. 3 or FIG. 5 to the piezoelectric element of the piezoelectric valve, and then removes the applied voltage, to make sure air is supplied in a stable manner from the blasting nozzle 71 even when the air blasting time becomes longer. Note that in the voltage waveform shown in FIG. 3 or FIG. 5, the time t2 relating to the size, etc., of each piece of granular materials to be removed is basically the only value that changes based on the aforementioned discharge signal, and other values such as applied voltages V1 to V4 and times t1, t3 to t5 can be obtained by testing and stored and set in the drive unit 72 beforehand.

Defective materials, etc., that have been blown away by blasting air supplied from the blasting nozzle 71 are discharged from the apparatus through a defective material discharge port 81. Good materials, etc., that have passed through the specified drop path without having been blown away by blasting air are recovered from a good material discharge port 82.

In the granular material-sorting apparatus proposed by the present invention, representative granular materials to be sorted is grain kernels, especially white rice grains. However, they are not limited to grain kernels and any granular materials can be sorted as long as its size and mass permit it to be blown away by blasting air.

The voltage waveforms of the piezoelectric valve proposed by the present invention, as shown in FIG. 3 and FIG. 5 above, are such that voltage is applied in two stages to the piezoelectric element when the valve opens, but voltage may be applied in three or more stages as long as gas can be ejected in a stable amount from the gas release channel.

The voltage waveform shown in FIG. 3 above is such that the third-stage voltage is applied at the fall of voltage, but this application of the third-stage voltage is not necessarily required in order to ensure a stable supply of gas in the piezoelectric valve during the gas ejection time.

The voltage waveform shown in FIG. 3 above is such that when the valve is closed, the third-stage voltage is applied and then the applied voltage is removed, but the voltage may be reduced in multiple stages as long as leakage of gas can be prevented after the valve closes.

In the voltage waveforms shown in FIG. 3 and FIG. 5 above, the values of applied voltages V1 to V4 and times t1, t3 to t5 vary depending on the gas ejection conditions, etc., but it is possible to supply gas in a stable manner without causing fluctuation in the ejection amount of gas, even when the gas ejection time becomes longer, if the pressure characteristics of gas ejected from the gas release channel are checked by testing and optimal condition values are obtained and stored and set in the drive unit 94 beforehand. Leakage of gas after the valve closes can also be prevented.

In a granular material-sorting apparatus that utilizes a piezoelectric valve conforming to the present invention, defective materials, etc., can be blown away reliably even when, for example, the granular materials to be removed is large and the air blasting time becomes longer, thereby ensuring stable sorting of granular materials.

The aforementioned piezoelectric valve proposed by the present invention can have any constitution other than the one shown in FIG. 1 as long as it comprises: a valve main body having a gas pressure chamber that takes in a supply of compressed gas from a compressed gas supply source as well as a gas release channel through which gas in the gas pressure chamber is ejected to the outside; a valve body placed in the gas pressure chamber to open and close the gas release channel; a piezoelectric element placed in the valve main body with its one end affixed to the valve main body; and a displacement amplification mechanism placed in the gas pressure chamber to amplify the displacement of the piezoelectric element and cause it to act upon the valve body.

The piezoelectric valve shown in FIG. 1 has a pair of displacement amplification mechanisms arranged in a symmetrical manner, but the displacement amplification mechanisms may be arranged in an asymmetrical manner or only one displacement amplification mechanism may be placed. Also note that, while the piezoelectric valve shown in FIG. 1 has its valve body provided at one end of a plate spring, the valve body may be provided on one end of an arm member.

It goes without saying that the present invention is not at all limited to the aforementioned modes and its constitution can be modified as deemed appropriate as long as such modifications do not deviate from the scope of the present invention.

A piezoelectric valve conforming to the present invention can supply gas in a stable manner even when the gas ejection time becomes longer, which gives this valve a great utility value.

Also, an optical granular material-sorting apparatus that utilizes the piezoelectric valve conforming to the present invention can blow away defective materials, etc., reliably and thus ensures stable sorting of granular materials, which makes this sorting apparatus very useful.

What is claimed is:

1. An optical granular material-sorting apparatus comprising:
    a transfer means for transferring objects-to-be-sorted;
    an optical detection means for detecting, at a detection position, objects-to-be-sorted while they are dropping from an end of the transfer means; and
    a blasting means provided below the optical detection means and designed to blow away objects-to-be-sorted through blasting of air based on the result of detection by the optical detection means;
    said optical granular material-sorting apparatus characterized in that the blasting means has a piezoelectric valve which is driven to blast air based on the result of detection by the optical detection means, and the piezoelectric valve comprises:
        a valve main body formed in which are a gas pressure chamber that takes in compressed gas supplied from the outside as well as a gas release channel through which the compressed gas is released from the gas pressure chamber;
        a valve body placed in the gas pressure chamber to open and close the gas release channel;

a piezoelectric element that generates, in the form of displacement, a driving force needed to operate the valve body;

at least one displacement amplification mechanism that amplifies a displacement of the piezoelectric element and causes it to act upon the valve body; and a driving means for applying voltage to the piezoelectric element in order to drive the valve body to open the valve and thereby open the gas release channel;

said piezoelectric valve characterized in that the driving means applies voltage to the piezoelectric element in multiple stages so as to suppress fluctuation in the amount of gas ejected from the gas release channel when the valve opens.

2. An optical granular material-sorting apparatus according to claim 1, characterized in that the driving means applies to the piezoelectric element in stages: a first voltage at which the valve body is driven to open the valve, and a second voltage which is greater than the first voltage and at which the ejection amount of gas is maintained after the valve opens.

3. An optical granular material-sorting apparatus according to claim 2, characterized in that the driving means allows the first voltage and application time thereof, as well as the second voltage, to be stored and set beforehand.

4. An optical granular material-sorting apparatus according to claim 1, characterized in that the driving means removes the voltage applied to the piezoelectric element, in stages, so that gas will not leak from the gas release channel after the valve closes.

5. An optical granular material-sorting apparatus according to claim 2, characterized in that the driving means removes the voltage applied to the piezoelectric element, in stages, so that gas will not leak from the gas release channel after the valve closes.

6. An optical granular material-sorting apparatus according to claim 3, characterized in that the driving means removes the voltage applied to the piezoelectric element, in stages, so that gas will not leak from the gas release channel after the valve closes.

7. An optical granular material-sorting apparatus according to claim 1, characterized in that the driving means applies pulsed voltage, after the removal of the voltage applied to the piezoelectric element, so that gas will not leak from the gas release channel after the valve closes.

8. An optical granular material-sorting apparatus according to claim 2, characterized in that the driving means applies pulsed voltage, after the removal of the voltage applied to the piezoelectric element, so that gas will not leak from the gas release channel after the valve closes.

9. An optical granular material-sorting apparatus according to claim 3, characterized in that the driving means applies pulsed voltage, after the removal of the voltage applied to the piezoelectric element, so that gas will not leak from the gas release channel after the valve closes.

* * * * *